US009515745B2

(12) United States Patent
Bosco et al.

(10) Patent No.: US 9,515,745 B2
(45) Date of Patent: Dec. 6, 2016

(54) ADAPTIVE EQUALIZATION IN COHERENT RECEIVERS USING A STOKES SPACE UPDATE ALGORITHM

(71) Applicant: Cisco Technology, Inc., San Jose, CA (US)

(72) Inventors: Gabriella Bosco, Bollengo (IT); Monica Visintin, Vercelli (IT); Pierluigi Poggiolini, Turin (IT); Fabrizio Forghieri, Monza (IT); Andrea Carena, Carmagnola (IT); Vittorio Curri, Nomaglio (IT)

(73) Assignee: Cisco Technology, Inc., San Jose, CA (US)

( * ) Notice: Subject to any disclaimer, the term of this patent is extended or adjusted under 35 U.S.C. 154(b) by 73 days.

(21) Appl. No.: 14/198,858

(22) Filed: Mar. 6, 2014

(65) Prior Publication Data

US 2015/0256268 A1 Sep. 10, 2015

(51) Int. Cl.
*H04B 10/00* (2013.01)
*H04B 10/12* (2006.01)
*H04B 10/06* (2006.01)
*H04B 10/61* (2013.01)

(52) U.S. Cl.
CPC ................. *H04B 10/6162* (2013.01)

(58) Field of Classification Search
CPC .................................................... H04B 10/61
USPC ................ 398/140, 149, 159, 158, 206, 213
See application file for complete search history.

(56) References Cited

U.S. PATENT DOCUMENTS

| 4,850,048 | A | * | 7/1989 | Mohr ..................... H04B 10/61 398/1 |
| 5,949,560 | A | * | 9/1999 | Roberts ............ H04B 10/07951 398/152 |
| 6,631,221 | B2 | * | 10/2003 | Penninckx ......... H04B 10/2569 385/11 |
| 6,671,045 | B1 | * | 12/2003 | Lee ................... H04B 10/07955 356/364 |
| 6,782,211 | B1 | * | 8/2004 | Core ..................... H04B 10/60 398/204 |
| 7,359,582 | B2 | * | 4/2008 | Colavolpe .............. G02B 6/274 359/249 |
| 8,989,602 | B2 | * | 3/2015 | Komaki ....................... 375/232 |
| 9,112,615 | B1 | * | 8/2015 | Thesling ............ H04B 10/6165 |

(Continued)

*Primary Examiner* — David Payne
*Assistant Examiner* — Pranesh Barua
(74) *Attorney, Agent, or Firm* — Edell, Shapiro & Finnan, LLC

(57) ABSTRACT

A coherent optical receiver including an optical transducer, an adaptive filter, and a processor updates the adaptive filter according to a metric derived in Stokes space. The optical transducer receives an optical signal corresponding to a modulated signal of symbols. The optical transducer also determines a first signal corresponding to a first polarization of the optical signal and a second signal corresponding to a second polarization of the optical signal. The adaptive filter recovers a first equalized signal and a second equalized signal from the first signal and the second signal. The first equalized signal and the second equalized signal form an equalized modulated signal of symbols. The processor calculates a set of Stokes parameters from the equalized modulated signal and updates the adaptive filter based on a metric derived from the set of Stokes parameters.

23 Claims, 5 Drawing Sheets

(56) References Cited

U.S. PATENT DOCUMENTS

| | | | | |
|---|---|---|---|---|
| 2005/0129346 A1* | 6/2005 | Chen | ............... | G02B 6/274 |
| | | | | 385/11 |
| 2009/0128814 A1* | 5/2009 | Szafraniec | ............ | G01J 4/04 |
| | | | | 356/364 |
| 2009/0273784 A1* | 11/2009 | Yamagaki | ............ | G01J 4/00 |
| | | | | 356/365 |
| 2009/0304064 A1* | 12/2009 | Liu | ............ | H04L 25/03057 |
| | | | | 375/232 |
| 2011/0249971 A1* | 10/2011 | Oda | ............ | H04B 10/2572 |
| | | | | 398/65 |
| 2012/0134684 A1* | 5/2012 | Koizumi | ......... | H04B 10/613 |
| | | | | 398/202 |
| 2012/0315043 A1* | 12/2012 | Nakagawa | ....... | H04B 10/5053 |
| | | | | 398/65 |
| 2013/0138375 A1* | 5/2013 | Zhou | ............ | H04B 10/6166 |
| | | | | 702/66 |
| 2013/0202021 A1* | 8/2013 | Zhang | ............ | H04B 10/614 |
| | | | | 375/232 |
| 2014/0010538 A1* | 1/2014 | Kikuchi | ............ | H04J 14/06 |
| | | | | 398/65 |
| 2014/0023133 A1* | 1/2014 | Foggi | ............ | H04L 25/0305 |
| | | | | 375/232 |
| 2014/0071436 A1* | 3/2014 | Cyr | ............... | G01N 21/21 |
| | | | | 356/73.1 |
| 2015/0030331 A1* | 1/2015 | Salsi | ............ | H04B 10/614 |
| | | | | 398/65 |

* cited by examiner

US 9,515,745 B2

ADAPTIVE EQUALIZATION IN COHERENT RECEIVERS USING A STOKES SPACE UPDATE ALGORITHM

TECHNICAL FIELD

The present disclosure relates to coherent optical signal reception and data decoding.

BACKGROUND

The combination of higher-order modulation formats and coherent detection with digital signal processing enables high spectral efficiency transmission over long-haul optical links. The digital signal processing in a coherent receiver typically comprises a cascade of several blocks, including a chromatic dispersion (CD) compensation block followed by an adaptive butterfly equalizer. The adaptive butterfly equalizer performs polarization de-multiplexing and dynamic compensation of polarization effects (e.g., polarization mode dispersion (PMD) and polarization dependent loss (PDL)).

DESCRIPTION OF EXAMPLE EMBODIMENTS

Overview

A coherent optical receiver comprises an optical transducer (e.g., a photodetector such as a photodiode), an adaptive filter, and a processor. The optical transducer is configured to receive an optical signal corresponding to a modulated signal comprising a plurality of modulated symbols. The optical transducer is also configured to detect a first signal corresponding to a first polarization of the optical signal and a second signal corresponding to a second polarization of the optical signal. The adaptive filter is configured to recover a first equalized signal and a second equalized signal from the first signal and the second signal. The first equalized signal and the second equalized signal form an equalized modulated signal comprising a plurality of equalized modulated symbols. The processor is configured to calculate a set of Stokes parameters from the equalized modulated signal and update the adaptive filter based on a metric derived from the set of Stokes parameters.

Example Embodiments

Figure 1:
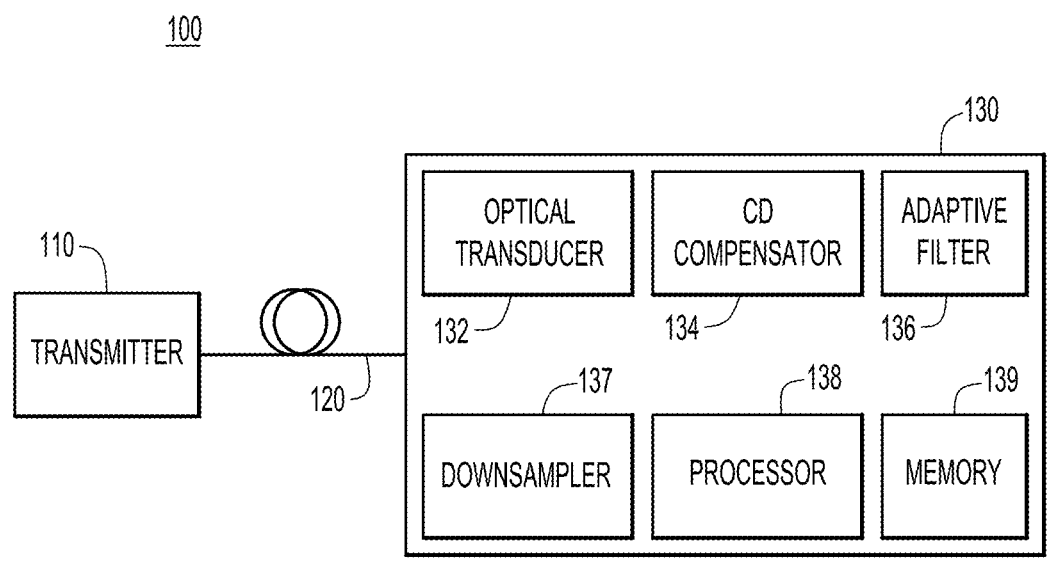
FIG. 1 is a block diagram of a data transmission system configured to transmit data according to an example embodiment.

Referring to FIG. 1, a coherent optical transmission system 100 is shown that enables coherent transmitter 110 to send data over optical path 120 to coherent receiver 130. The coherent receiver 130 comprises an optical transducer 132, a chromatic dispersion (CD) compensator 134, adaptive filter 136, and downsampler 137. Receiver 130 also includes a processor 138 to process instructions relevant to processing the received signal and memory 139 to store a variety of data and software instructions pertaining to modulation formats and/or tap weights of the adaptive filter. In one example, the optical path 120 is a fiber optic cable, but other types of optical paths may include waveguides, open air, or any combination of these types of optical paths. In one example, the data is sent as modulated symbols of a specific modulation format (e.g., quadrature amplitude modulation (QAM), or phase shift keying (PSK)) according to a specific constellation (e.g., binary phase shift keying (BPSK), quadrature PSK (QPSK), 16-QAM, etc.). The symbols of the data may be polarization multiplexed with symbols conveyed across two different polarization modes simultaneously. In one example, the polarization modes are linear polarization modes (e.g., x-polarization and y-polarization, also denoted first and second polarizations herein). Alternatively, other polarization modes (e.g., circular or elliptical polarization) may be used, as long as the two modes to be multiplexed are orthogonal.

The optical transducer 132 may include a photodetector that converts an optical signal received from optical path 120 into electrical signals. In one example, the optical transducer converts the optical signal into two electrical signals corresponding to the electric field along orthogonal linear directions, such that two electric signals denoted $E_x$ and $E_y$ compose a polarization multiplexed signal. CD compensator 134 operates to mitigate any chromatic dispersion that was introduced into the optical signal in the transmission over optical path 120. Adaptive filter 136 may operate on a number of samples from the optical signal to determine the symbol transmitted (e.g., as a number of samples) from the transmitter 110. Downsampler 137 operates to pick a single sample to represent the received symbol.

Memory 139 may comprise read only memory (ROM), random access memory (RAM), magnetic disk storage media devices, optical storage media devices, flash memory devices, electrical, optical, or other physical/tangible (e.g., non-transitory) memory storage devices. The processor 138 is, for example, a microprocessor or microcontroller that executes instructions for implementing the processes described herein. Thus, in general, the memory 139 may comprise one or more tangible (non-transitory) computer readable storage media (e.g., a memory device) encoded with software comprising computer executable instructions and when the software is executed (by the processor 138) it is operable to perform the operations described herein.

Figure 2:
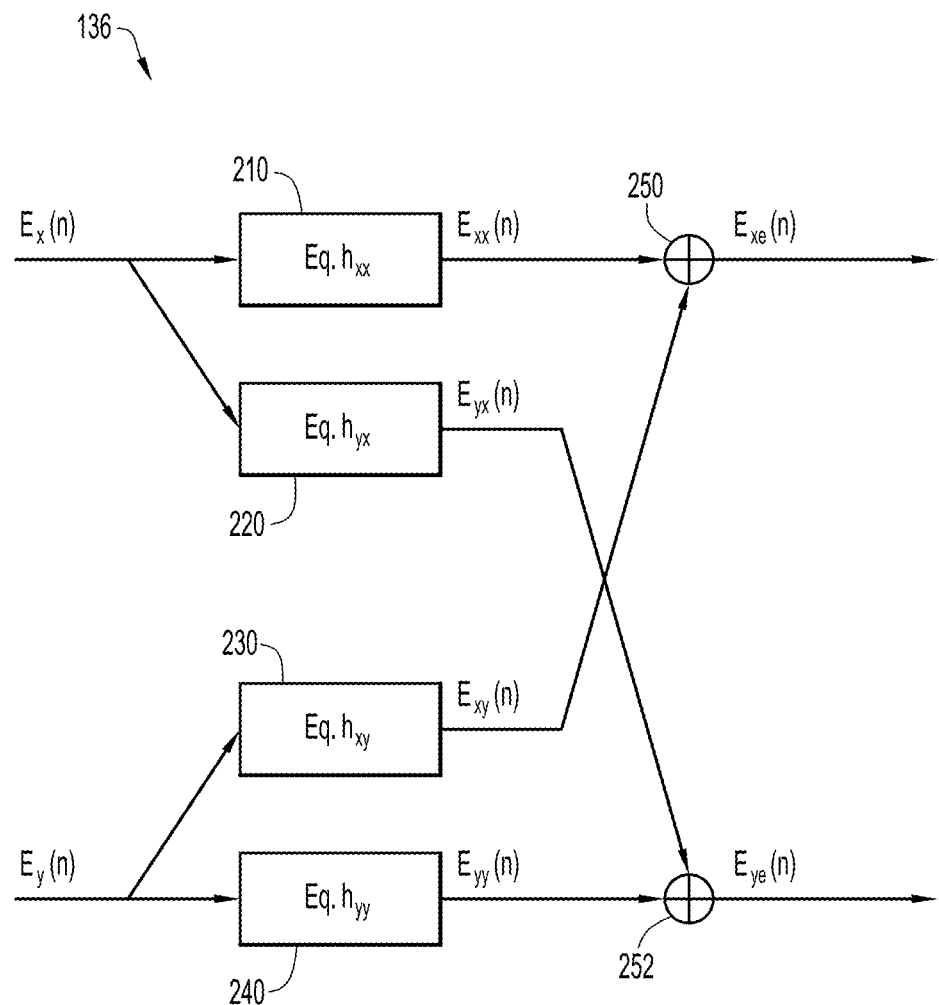
FIG. 2 is a general block diagram of an example embodiment of an adaptive filter for generating an equalized polarization multiplexed optical signal according to the techniques presented herein.

Referring now to FIG. 2, a general block diagram of adaptive filter 136 is shown. Adaptive filter 136 comprises four equalizers 210, 220, 230, and 240 arranged in a butterfly configuration. Adder 250 operates to add the signals output from equalizers 210 and 230, and adder 252 operates to add the signals output from equalizers 220 and 240. The four equalizers collectively operate to remove polarization mode dispersion (PMD) and polarization dependent losses (PDL) that may cause the signal from the first polarization to mix with the signal from the second polarization, as well as other inter-symbol interference. In one example, the signal $E_x(n)$, corresponding to an $n^{th}$ transmitted sample with x-polarization (first polarization), is input to equalizers 210 and 220, while the signal $E_y(n)$, corresponding to an $n^{th}$ transmitted sample with y-polarization (second polarization), is input to equalizers 230 and 240. In this example, equalizer 210 operates on signal $E_x(n)$ with a tap weight of $h_{xx}$ to generate $E_{xx}(n)$. Similarly, equalizer 220 operates on signal $E_x(n)$ with a tap weight of $h_{yx}$ to generate $E_{yx}(n)$, equalizer 230 operates on signal $E_y(n)$ with a tap weight of $h_{xy}$ to generate $E_{xy}(n)$, and equalizer 240 operates on signal $E_y(n)$ with a tap weight of $h_{yy}$ to generate $E_{yy}(n)$. The signals $E_{xx}(n)$ and $E_{xy}(n)$ are added by adder 250 to generate the equalized signal $E_{xe}(n)$, and the signals $E_{yx}(n)$ and $E_{yy}(n)$ are added by adder 252 to generate the equalized signal $E_{ye}(n)$.

One method of visualizing the function of adaptive filter 136 and equalizers 210-240 is to consider a case in which $E_x(n)$ and $E_y(n)$ may have mixed while in transit over optical path 120 (FIG. 1). In this case, the signal that is received as $E_x(n)$ contains a part of what was transmitted as $E_y(n)$, and the signal that is received as $E_y(n)$ contains a part of what was transmitted as $E_x(n)$. Equalizer 210 operates to select the part of the received $E_x(n)$ that was mixed into $E_x(n)$ during transmission, and equalizer 220 operates to select the part of $E_x(n)$ that was mixed into $E_y(n)$ during transmission. Similarly, equalizer 240 operates to select the part of the received $E_y(n)$ that was mixed into $E_y(n)$ during transmission, and equalizer 230 operates to select the part of the received $E_y(n)$ that was mixed into $E_x(n)$ during transmission. Adding the outputs from equalizers 210 and 230 ideally recovers the signal that was transmitted with x-polarization, and adding the output from equalizers 220 and 240 ideally recovers the signal that was transmitted with y-polarization.

Figure 3:
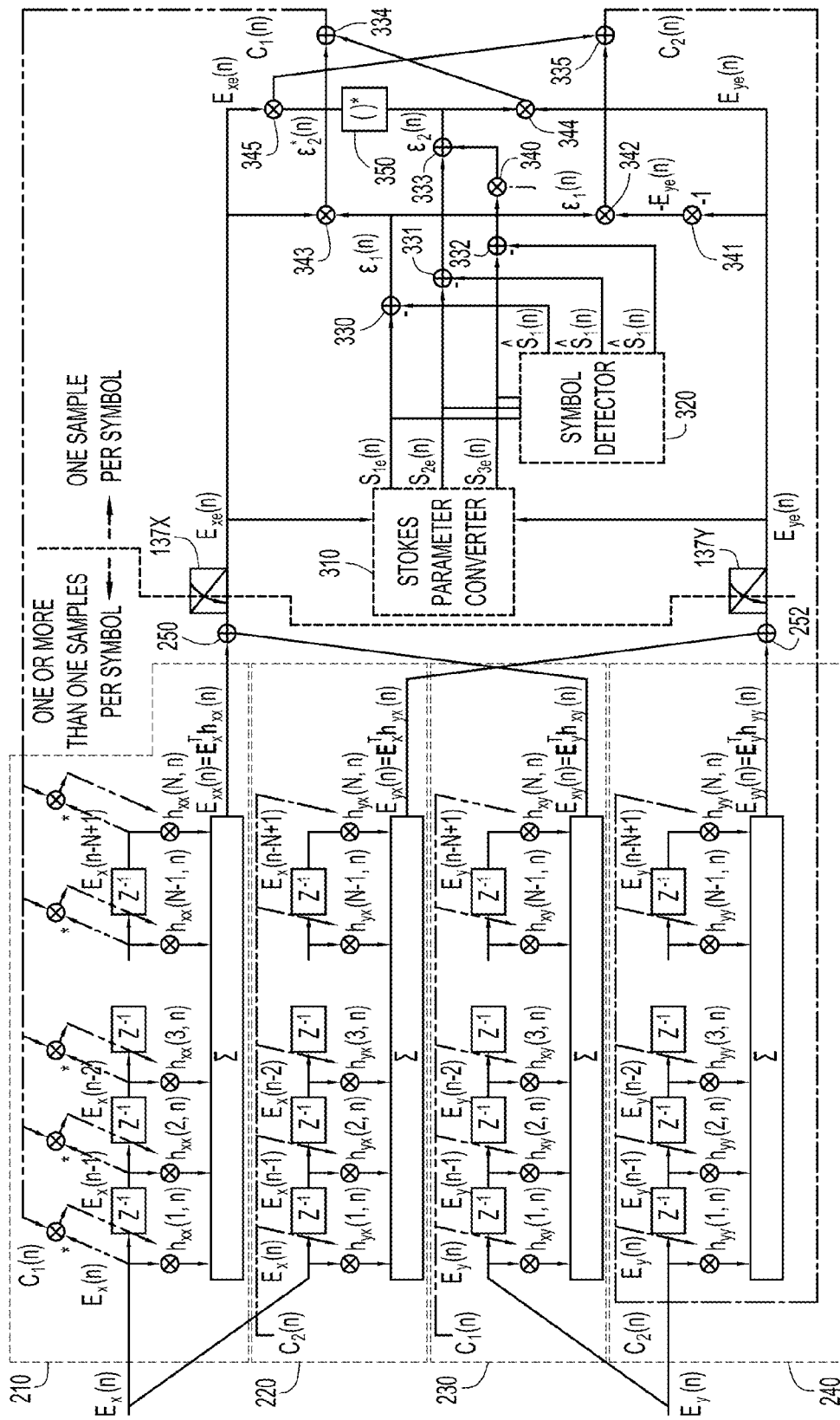
FIG. 3 is a detailed block diagram of an example embodiment of an adaptive butterfly filter.

Referring now to FIG. 3, a detailed block diagram of adaptive filter 136 and one example of circuit/computation blocks to implement the algorithm that updates the tap weights is shown. Each of the equalizers 210-240 includes a chain of delay elements and associated multipliers, as described below in connection with FIG. 4. Following the output of equalizers 210-240, as described with respect to FIG. 2, downsamplers 137X and 137Y each select a single sample to represent the $n^{th}$ symbol received in the x-polarization and y-polarization, $E_{xe}(n)$ and $E_{ye}(n)$, respectively. $E_{xe}(n)$ and $E_{ye}(n)$ are converted to a Stokes space representation $\{S_{1e}(n), S_{2e}(n), S_{3e}(n)\}$ by Stokes parameter converter 310 for the purpose of updating the tap weights of the adaptive filter 136. The Stokes representation of the equalized signals is input into a Stokes space symbol detector 320, which generates a Stokes representation $\{\hat{S}_1(n), \hat{S}_2(n), \hat{S}_3(n)\}$ of the undistorted constellation point mostly likely to have been transmitted according to a decision metric described hereinafter. The Stokes representation of the equalized signal is compared to the Stokes representation of the constellation point to generate, after some intermediate operations, update coefficients $C_1(n)$ and $C_2(n)$. The intermediate operations are represented by adders 330, 331, 332, 333, 334, and 335, multipliers 340, 341, 342, 343, 344, and 345, and complex conjugate operator 350, which execute operations in accordance with equations described in detail hereinafter. Update coefficient $C_1(n)$ is fed back to equalizers 210 and 230, and update coefficient $C_2(n)$ is fed back to equalizers 220 and 240.

In one example, each equalizer 210-240 incorporates samples from previous symbols to filter the signals for the current (i.e., $n^{th}$) samples. Each equalizer 210-240 may store up to a predetermined number N of tap weights along with up to N−1 values of past samples. In this example, the equalized output signals $E_{xe}(n)$ and $E_{ye}(n)$ are given by:

$$E_{xe}(n) = E_x^T h_{xx}(n) + E_y^T h_{xy}(n) \quad E_{ye}(n) = E_x^T h_{yx}(n) + E_y^T h_{yy}(n) \quad (1)$$

where $h_{xx}(n)$, $h_{xy}(n)$, $h_{yx}(n)$, and $h_{yy}(n)$ are column vectors storing the N complex tap weights for the $n^{th}$ sample of equalizers 210, 220, 230, and 240, respectively, and $E_x^T$ and $E_y^T$ store the N−1 past samples as $[E_x(n)\ E_x(n-1)\ \ldots\ E_x(n-N+1)]$ and $[E_y(n)\ E_y(n-1)\ \ldots\ E_y(n-N+1)]$, respectively.

The signals $E_{xe}(n)$ and $E_{ye}(n)$ may be represented in the Stokes space as:

$$S_{1e}(n) = |E_{xe}(n)|^2 - |E_{ye}(n)|^2, S_{2e}(n) =$$
$$2\,\Re\{E_{xe}(n)E_{ye}^*(n)\}, S_{3e}(n) = 2\Im\{E_{xe}(n)E_{ye}^*(n)\} \quad (2)$$

where $\Re\{A\}$ denotes the real portion of a complex number A, $\Im\{A\}$ denotes the imaginary portion of a complex number A, and A* denotes the complex conjugate of the complex number A.

Note that the Stokes representation removes all phase information present in the two polarizations, thus it is independent of phase noise and frequency offset. By substituting equation (1) into equation (2), the Stokes representation of the equalized output may be calculated as:

$$S_{1e}(n) = |E_x^T h_{xx}|^2 + |E_y^T h_{xy}|^2 + 2\,\Re\{(E_x^T h_{xx})(E_y^T h_{xy})^*\} -$$
$$[|E_y^T h_{yy}|^2 + |E_x^T h_{yx}|^2 + 2\,\Re\{(E_x^T h_{yx})(E_y^T h_{yy})^*\}]$$

$$S_{2e}(n) = 2\,\Re\{(E_x^T h_{xx})(E_x^T h_{yx})^*\} + 2\,\Re\{(E_x^T h_{xx})$$
$$(E_x^T h_{yy})^*\} + 2\,\Re\{(E_x^T h_{xx})(E_y^T h_{xy})(E_x^T h_{yx})^*\} +$$
$$2\,\Re\{(E_y^T h_{xy})(E_y^T h_{yy})^*\}$$

$$S_{3e}(n) = 2\Im\{(E_x^T h_{xx})(E_x^T h_{yx})^*\} +$$
$$2\Im\{(E_x^T h_{xx})(E_y^T h_{yy})^*\} + 2\Im\{(E_y^T h_{xy})(E_x^T h_{yx})^*\} +$$
$$2\Im\{(E_y^T h_{xy})(E_y^T h_{yy})^*\} \quad (3)$$

Since the difference between the $n^{th}$ transmitted symbol and the equalized value of the $n^{th}$ received symbol is small, the Stokes representation of the equalized signal may be used by symbol detector 320 to make a correct decision in detecting the $n^{th}$ symbol $\{\hat{S}_1(n), \hat{S}_2(n), \hat{S}_3(n)\}$ from the Stokes representation of the equalized signal $\{S_{1e}(n), S_{2e}(n), S_{3e}(n)\}$. In one example, a minimum distance criterion is used in the decision algorithm. The error signal between the equalized values $\{S_{1e}(n), S_{2e}(n), S_{3e}(n)\}$ and the estimated transmitted values $\{\hat{S}_1(n), \hat{S}_2(n), \hat{S}_3(n)\}$, due to a not yet perfect setting of the tap weights, as calculated by the minimum distance criterion, is given by:

$$f(h(n)) = f(h_{xx}(n), h_{xy}(n), h_{yx}(n), h_{yy}(n)) = (S_{1e}(n) - \hat{S}_1(n))^2 +$$
$$(S_{2e}(n) - \hat{S}_2(n))^2 + (S_{3e}(n) - \hat{S}_3(n))^2. \quad (4)$$

Minimization of the previous distance described in equation (4) is equivalent to maximization of the simpler error function obtained assuming a Gaussian distribution of noisy received vectors in Stokes space:

$$m = -\hat{S}_0^2(n) + 2\hat{S}_0(n) r(n) \cos(t(n)) \quad (4a)$$

where $\hat{S}_0(n)$ is the magnitude of the Stokes vector corresponding to the constellation point $\{\hat{S}_1(n), \hat{S}_2(n), \hat{S}_3(n)\}$, $r(n)$ is the magnitude of the Stokes vector corresponding to the equalized signal $\{S_{1e}(n), S_{2e}(n), S_{3e}(n)\}$, and $t(n)$ is the angle between the two vectors.

In an alternative example, a metric based on Stokes space statistics may be used for the minimization criterion in the decision algorithm. This alternative decision rule is based on the maximization of the logarithm of the exact probability density function of the noisy received vector in Stokes space over all possible noiseless constellation points. Eliminating all common factors across all possible noiseless constellation points, the following metric may be obtained:

$$m = -\hat{S}_0(n) + 2\sqrt{\hat{S}_0(n)}\sqrt{r(n)}\cos\left(\frac{t(n)}{2}\right). \quad (4b)$$

The equalizer taps may be updated at each symbol interval, which may comprise a plurality of sample intervals, with the following updating rule:

$$h_{xx}(n+1)=h_{xx}(n)-\mu \nabla_{h_{xx}} f(h(n))$$

$$h_{xy}(n+1)=h_{xy}(n)-\mu \nabla_{h_{xy}} f(h(n))$$

$$h_{yx}(n+1)=h_{yx}(n)-\mu \nabla_{h_{yx}} f(h(n))$$

$$h_{yy}(n+1)=h_{yy}(n)-\mu \nabla_{h_{yy}} f(h(n)) \quad (5)$$

where $\mu$ is a small positive real number that scales the updating coefficient. The gradients in equation (5) may be evaluated as:

$$\nabla_{h_{xx}} f(h(n))=4[(S_{1e}(n)-\hat{S}_1(n))E_{xe}(n)+(S_{2e}(n)-\hat{S}_2(n))E_{ye}(n)+j(S_{3e}(n)-\hat{S}_3(n))E_{ye}(n)]E_x^*=C_1(n)E_x^*$$

$$\nabla_{h_{yy}} f(h(n))=4[-(S_{1e}(n)-\hat{S}_1(n))E_{ye}(n)+(S_{2e}(n)-\hat{S}_2(n))E_{xe}(n)-j(S_{3e}(n)-\hat{S}_3(n))E_{xe}(n)]E_y^*=C_2(n)E_y^*$$

$$\nabla_{h_{xy}} f(h(n))=4[(S_{1e}(n)-\hat{S}_1(n))E_{xe}(n)+(S_{2e}(n)-\hat{S}_2(n))E_{ye}(n)+j(S_{3e}(n)-\hat{S}_3(n))E_{ye}(n)]E_y^*=C_1(n)E_y^*$$

$$\nabla_{h_{yx}} f(h(n))=4[-(S_{1e}(n)-\hat{S}_1(n))E_{ye}(n)+(S_{2e}(n)-\hat{S}_2(n))E_{xe}(n)-j(S_{3e}(n)-\hat{S}_3(n))E_{xe}(n)]E_x^*=C_2(n)E_x^* \quad (6)$$

The flow of the signal data through the various mathematical operators 330-335, 340-345, and 350, as shown in FIG. 3, create two updating coefficients $C_1(n)$ and $C_2(n)$ that replicate the gradient functions of equations (6) when multiplied by the appropriate $E_x$ or $E_y$.

Figure 4:
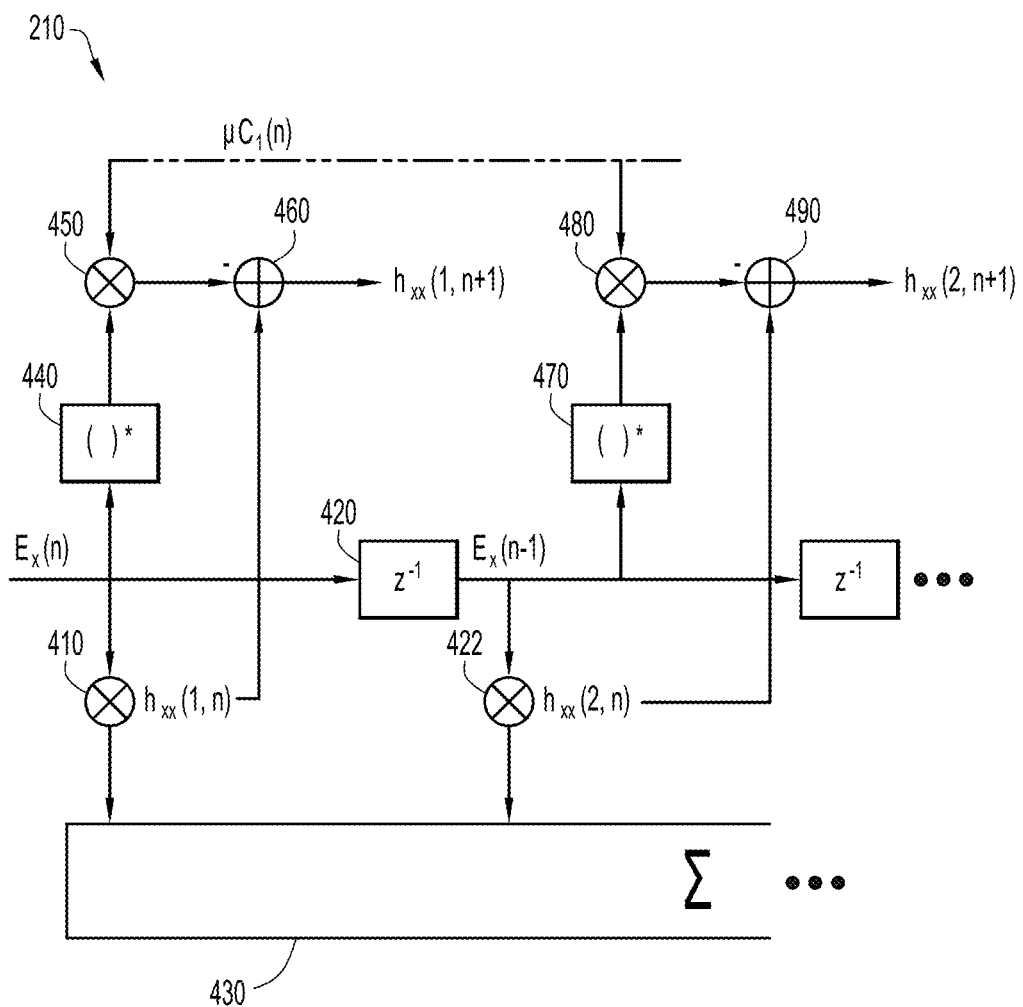
FIG. 4 is an enlarged block diagram of one of the four equalizers in the adaptive filter according to an example embodiment.

Referring now to FIG. 4, an enlarged view of one equalizer 210 in the adaptive filter 136 is shown with an example of updating the tap weight $h_{xx}(n)$ to $h_{xx}(n+1)$. Equalizer 210 takes the signal $E_x(n)$ and multiplies it by tap weight $h_{xx}(1,n)$ with multiplier 410. Delay element 420 obtains the signal $E_x(n-1)$ and multiplies it by tap weight $h_{xx}(2,n)$ with multiplier 422. Additional delay elements may allow equalizer 210 to obtain further samples that were previously received and multiply these samples by their respective tap weights. In FIG. 4, the last two signals are shown being multiplied by their respective tap weight, with the resulting products being added by summer 430. The receiver takes the results of summer 430, and generates updating coefficient $C_1(n)$, as described above with respect to FIG. 3.

The complex conjugate of the current signal $E_x(n)$ is obtained by operator 440, is multiplied by the updating coefficient $C_1(n)$ (multiplied by a scaling constant $\mu$) by multiplier 450, and subtracted from the current tap weight $h_{xx}(1,n)$ by adder 460 to produce the updated tap weight $h_{xx}(1,n+1)$. Similarly, the complex conjugate of the previous sample $E_x(n-1)$ is obtained by operator 470, is multiplied by the updating coefficient $C_1(n)$ (multiplied by the scaling constant $\mu$) by multiplier 480, and subtracted from the current tap weight $h_{xx}(2,n)$ by adder 490 to produce the updated tap weight $h_{xx}(2,n+1)$. Equalizers 220, 230, and 240 perform similar computations to update their respective tap weights $h_{xy}(n)$, $h_{yx}(n)$, and $h_{yy}(n)$ to $h_{xy}(n+1)$, $h_{yx}(n+1)$, and $h_{yy}(n+1)$.

FIG. 4 also shows an example of using a previous sample to refine the equalizing process. In this example, the tap weight $h_{xx}(n)$ is a vector with components corresponding to each of the previous received samples. In the example shown in FIG. 4, $h_{xx}(1,n)$ corresponds to the tap weight to be applied to the current signal $E_x(n)$ to calculate the output of equalizer 210 for the $n^{th}$ sample, and $h_{xx}(2,n)$ corresponds to the tap weight to be applied to the signal $E_x(n-1)$ for the previous sample to calculate the output of equalizer 210 for the $n^{th}$ sample. Each of the tap weights corresponding to previously received samples are also updated with the same scaled updating coefficient as described above for the tap weight $h_{xx}(1,n)$ corresponding to the input signal sample $E_x(n)$.

Figure 5:
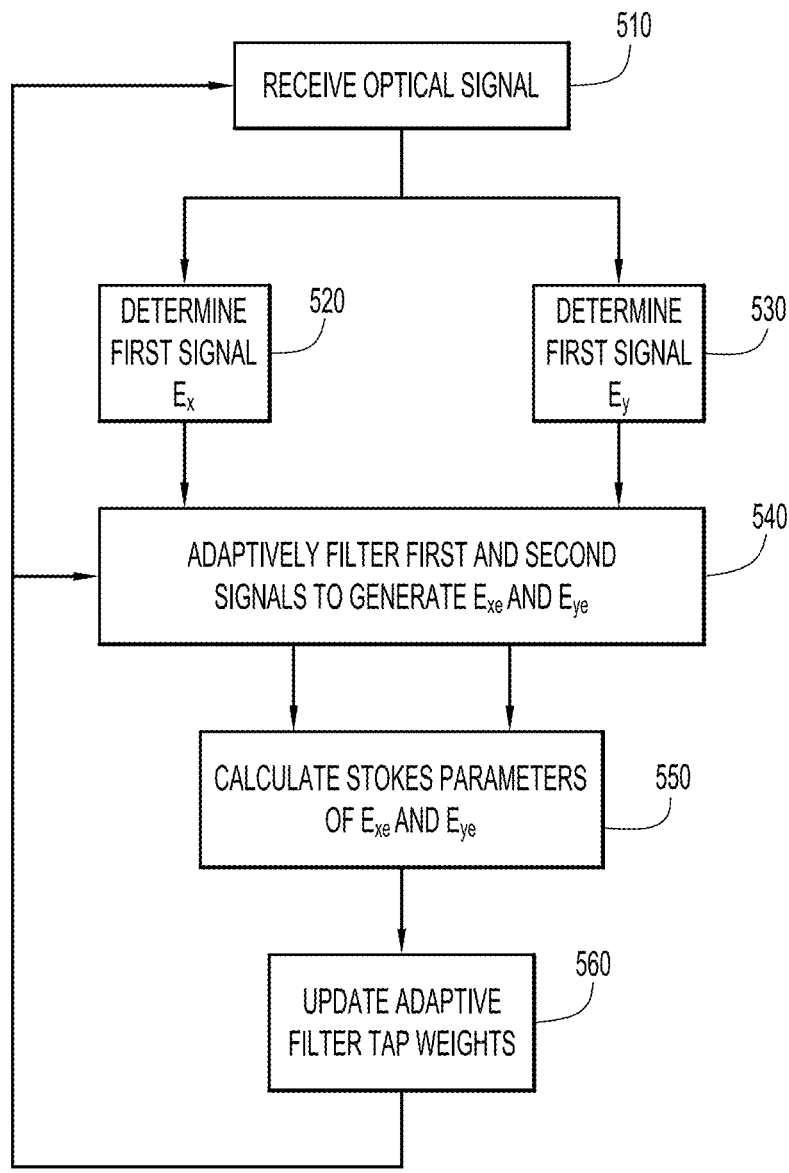
FIG. 5 is a flowchart diagram of an example process for equalizing an optical signal according the techniques presented herein.

Referring now to FIG. 5, a flowchart showing an example process 500 for updating the adaptive filter 136 is shown. In step 510, coherent receiver 130 receives a polarization multiplexed optical signal. In step 520, receiver 130 determines a first signal $E_x$ corresponding to a first polarization. Similarly, in step 530, receiver 130 determines a second signal $E_y$ corresponding to a second polarization. Receiver 130 adaptively filters $E_x$ and $E_y$ to generate equalized signals $E_{xe}$ and $E_{ye}$ at step 540. In step 550, the receiver 130 calculates the Stokes parameters of the equalized signals $E_{xe}$ and $E_{ye}$. Using a metric based on the Stokes space representation, the receiver 130 updates the adaptive filter tap weights in step 560. Finally, the receiver 130 returns to step 510 and receives the next sample in the polarization multiplexed optical signal, which it will process with the updated tap weights of the adaptive filter.

In summary, the techniques presented herein provide for an update algorithm for a butterfly equalizer in a coherent receiver that is based on error signals evaluated in Stokes space. This allows the error signals to be independent of both phase noise and frequency offset. This update algorithm provides an improved Optical Signal-to-Noise Ratio (OSNR) compared to receivers with conventional update algorithms. More precisely, the Stokes space symbol detector uses either the minimum distance or a modified metric in order to make a decision in Stokes space, i.e. to select, among all states of polarizations of possible transmitted signals, the one with the maximum likelihood of having been transmitted (based on the used metric)

In one example, the techniques presented herein provide for a method of receiving an optical signal corresponding to a modulated signal. The modulated signal comprises a plurality of modulated symbols. A first signal corresponding to a first polarization of the optical signal is determined. Similarly, a second signal corresponding to a second polarization of the optical signal is determined. The first and second signals are filtered with an adaptive filter to recover a first equalized signal and a second equalized signal. The first equalized signal and second equalized signal form an equalized modulated signal comprising a plurality of equalized modulated symbols. From the equalized modulation signal, a set of Stokes parameters is computed. The adaptive filter is then updated based on a metric derived from the set of Stokes parameters.

In another example, the techniques presented herein provide for an apparatus comprising an optical transducer, an adaptive filter, and a processor. The optical transducer is configured to receive an optical signal corresponding to a modulated signal comprising a plurality of modulated symbols. The optical transducer is also configured to obtain a first signal corresponding to a first polarization of the optical signal and a second signal corresponding to a second polarization of the optical signal. The adaptive filter is configured to recover a first equalized signal and a second equalized signal from the first signal and the second signal. The first equalized signal and the second equalized signal form an equalized modulated signal comprising a plurality of equalized modulated symbols. The processor is configured to calculate a set of Stokes parameters from the equalized modulated signal and update the adaptive filter based on a metric derived from the set of Stokes parameters.

The above description is intended by way of example only. Various modifications and structural changes may be made therein without departing from the scope of the concepts described herein and within the scope and range of equivalents of the claims.

What is claimed is:

1. A method comprising:
   receiving an optical signal corresponding to a modulated signal comprising a plurality of modulated symbols;
   determining a first signal corresponding to a first polarization of the optical signal;
   determining a second signal corresponding to a second polarization of the optical signal;
   filtering the first signal and the second signal with an adaptive filter to obtain a first equalized signal and a second equalized signal, the first equalized signal and the second equalized signal forming an equalized modulated signal comprising a plurality of equalized modulated symbols;
   computing a set of Stokes parameters from the equalized modulation signal; and
   updating the adaptive filter by minimizing or maximizing a metric derived from the set of Stokes parameters, wherein metric m is computed as:

$$m = -S_0 + 2\sqrt{S_0}\sqrt{r}\cos\left(\frac{t}{2}\right),$$

where m is the metric to be minimized or maximized, $S_0$ is a magnitude of a constellation vector in Stokes space, r is a magnitude of a vector comprising the set of Stokes parameters calculated from the equalized modulation signal, and t is an angle between the constellation vector and the vector comprising the set of Stokes parameters calculated from the equalized modulation signal.

2. The method of claim 1, wherein the equalized modulation signal comprises a pair of polarization multiplexed modulation symbols corresponding to the first polarization and the second polarization.

3. The method of claim 1, wherein filtering the first signal and the second signal with an adaptive filter comprises filtering the first and second signals with a butterfly equalizer, the butterfly equalizer comprising a plurality of complex tap weights, and wherein updating comprises updating the plurality of complex tap weights.

4. The method of claim 1, wherein the first polarization comprises a linear polarization in an x-direction, the first signal corresponds to an electric field $E_x$ in the x-direction, and the first equalized signal corresponds to an electric field $E_{xe}$ in the x-direction.

5. The method of claim 4, wherein the second polarization comprises a linear polarization in a y-direction orthogonal to the x-direction, the second signal corresponds to an electric field $E_y$ in the y-direction, and the second equalized signal corresponds to an electric field $E_{ye}$ in the y-direction.

6. The method of claim 5, wherein filtering the first signal and the second signal with an adaptive filter comprises filtering the first and second signal with a butterfly equalizer, the butterfly equalizer comprising a plurality of complex tap weights corresponding to a plurality of signals equalized at a previous update cycle, and wherein an $n^{th}$ equalized x-polarization signal $E_{xe}(n)$ corresponding to the first equalized signal is computed by $E_{xe}(n)=E_x^T h_{xx}+E_y^T h_{xy}$, an $n^{th}$ equalized y-polarization signal $E_{ye}(n)$ corresponding to the second equalized signal is computed by $E_{ye}(n)=E_x^T h_{yx}+E_y^T h_{yy}$, where $E_x^T$ and $E_y^T$ are vectors comprising the electric field $E_x$ and the electric field $E_y$, respectively, for a plurality of previously received samples in the optical signal, and $h_{xx}$, $h_{xy}$, and $h_{yx}$, are vectors comprising complex tap weights corresponding to the plurality of previously received samples.

7. The method of claim 6, wherein the Stokes parameters comprise $S_{1e}$, $S_{2e}$, and $S_{3e}$ defined by $S_{1e}(n)=|E_{xe}(n)|^2-|E_{ye}(n)|^2$, $S_{2e}(n)=2\Re\{E_{xe}(n)E_{ye}^*(n)\}$, and $S_{3e}(n)=2\Im\{E_{xe}(n)E_{ye}^*(n)\}$, where $\Re\{A\}$ denotes the real portion of a complex number A, $\Im\{A\}$ denotes the imaginary part of the complex number A, and A* denotes the complex conjugate of the complex number A.

8. The method of claim 1, wherein the equalized modulation signal comprises a Polarization Multiplexed Quadrature Amplitude Modulation (PM-QAM) signal or a Polarization Multiplexed Phase Shift Keying (PM-PSK) signal.

9. An apparatus comprising:
   an optical transducer configured to:
      receive an optical signal corresponding to a modulated signal comprising a plurality of modulated symbols;
      obtain a first signal corresponding to a first polarization of the optical signal; and
      obtain a second signal corresponding to a second polarization of the optical signal;
   an adaptive filter configured to recover a first equalized signal and a second equalized signal, the first equalized signal and the second equalized signal forming an equalized modulated signal comprising a plurality of equalized modulated symbols; and
   a processor configured to:
      calculate a set of Stokes parameters from the equalized modulated signal; and
      update the adaptive filter by minimizing or maximizing a metric derived from the set of Stokes parameters, wherein metric m is computed as:

$$m = -S_0 + 2\sqrt{S_0}\sqrt{r}\cos\left(\frac{t}{2}\right),$$

where m is the metric to be minimized or maximized, $S_0$ is a magnitude of a constellation vector in Stokes space, r is a magnitude of a vector comprising the set of Stokes parameters calculated from the equalized modulation signal, and t is an angle between the constellation vector and the vector comprising the set of Stokes parameters calculated from the equalized modulation signal.

10. The apparatus of claim 9, wherein the equalized modulation signal comprises a pair of polarization multiplexed modulation symbols corresponding to the first polarization and the second polarization.

11. The apparatus of claim 9, wherein the adaptive filter comprises a butterfly equalizer having a plurality of complex tap weights, and wherein the processor is configured to update the plurality of complex tap weights.

12. The apparatus of claim 9, wherein the first polarization comprises a linear polarization in an x-direction, the first signal corresponds to an electric field $E_x$ in the x-direction, and the first equalized signal corresponds to an electric field $E_{xe}$ in the x-direction.

13. The apparatus of claim 12, wherein the second polarization comprises a linear polarization in a y-direction orthogonal to the x-direction, the second signal corresponds to an electric field $E_y$ in the y-direction, and the second equalized signal corresponds to an electric field $E_{ye}$ in the y-direction.

14. The apparatus of claim 13, wherein the adaptive filter comprises a butterfly equalizer with a plurality of complex tap weights corresponding to a plurality of signals equalized at a previous update cycle, and wherein an $n^{th}$ equalized x-polarization signal $E_{xe}(n)$ corresponding to the first equalized signal is computed by $E_{xe}(n)=E_x^T h_{xx} + E_y^T h_{xy}$, an $n^{th}$ equalized y-polarization signal $E_{ye}(n)$ corresponding to the second equalized signal is computed by $E_{ye}(n)=E_x^T h_{yx} + E_y^T h_{yy}$, where $E_x^T$ and $E_y^T$ are vectors comprising the electric field $E_x$ and the electric field $E_y$, respectively, for a plurality of previously received samples in the optical signal, and $h_{xx}$, $h_{xy}$, $h_{yy}$, and $h_{yx}$ are vectors comprising complex tap weights corresponding to the plurality of previously received samples.

15. The apparatus of claim 14, wherein the Stokes parameters comprise $S_{1e}$, $S_{2e}$, and $S_{3e}$ defined by $S_{1e}(n)=|E_{xe}(n)|^2-|E_{ye}(n)|^2$, $S_{2e}(n)=2\Re\{E_{xe}(n)E_{ye}^*(n)\}$, and $S_{3e}(n)=2\Im\{E_{xe}(n)E_{ye}^*(n)\}$, where $\Re\{A\}$ denotes the real portion of a complex number A, $\Im\{A\}$ denotes the imaginary part of the complex number A, and A* denotes the complex conjugate of the complex number A.

16. The apparatus of claim 9, wherein the equalized modulation signal comprises a Polarization Multiplexed Quadrature Amplitude Modulation (PM-QAM) signal or a Polarization Multiplexed Phase Shift Keying (PM-PSK) signal.

17. One or more non-transitory computer readable storage media storing instructions that, when executed by a processor, cause the processor to:
   obtain an optical signal from an optical transducer, the optical signal corresponding to a modulated signal comprising a plurality of modulated symbols;
   determine a first signal corresponding to a first polarization of the optical signal;
   determine a second signal corresponding to a second polarization of the optical signal;
   filter the first signal and the second signal with an adaptive filter to obtain a first equalized signal and a second equalized signal, the first equalized signal and the second equalized signal forming an equalized modulated signal comprising a plurality of equalized modulated symbols;
   compute a set of Stokes parameters from the equalized modulation signal; and
   update the adaptive filter by minimizing or maximizing a metric derived from the set of Stokes parameters, wherein metric m is computed as:

$$m = -S_0 + 2\sqrt{S_0}\sqrt{r}\cos\left(\frac{t}{2}\right),$$

where m is the metric to be minimized or maximized, $S_0$ is a magnitude of a constellation vector in Stokes space, r is a magnitude of a vector comprising the set of Stokes parameters calculated from the equalized modulation signal, and t is an angle between the constellation vector and the vector comprising the set of Stokes parameters calculated from the equalized modulation signal.

18. The computer readable storage media of claim 17, wherein the equalized modulation signal comprises a pair of polarization multiplexed modulation symbols corresponding to the first polarization and the second polarization.

19. The computer readable storage media of claim 17, further comprising instructions that cause the processor to filter the first signal and the second signal with an adaptive filter by filtering the first and second signals with a butterfly equalizer, the butterfly equalizer comprising a plurality of complex tap weights, and wherein updating comprises updating the plurality of complex tap weights.

20. The computer readable storage media of claim 17, wherein the first polarization comprises a linear polarization in an x-direction, the first signal corresponds to an electric field $E_x$ in the x-direction, and the first equalized signal corresponds to an electric field $E_{xe}$ in the x-direction, and wherein the second polarization comprises a linear polarization in a y-direction orthogonal to the x-direction, the second signal corresponds to an electric field $E_y$ in the y-direction, and the second equalized signal corresponds to an electric field $E_{ye}$ in the y-direction.

21. The computer readable storage media of claim 20, further comprising instructions that cause the processor to filter the first signal and the second signal with an adaptive filter by filtering the first and second signal with a butterfly equalizer, the butterfly equalizer comprising a plurality of complex tap weights corresponding to a plurality of signals equalized at a previous update cycle, and wherein an $n^{th}$ equalized x-polarization signal $E_{xe}(n)$ corresponding to the first equalized signal is computed by $E_{xe}(n)=E_x^T h_{xx} + E_y^T h_{xy}$, an $n^{th}$ equalized y-polarization signal $E_{ye}(n)$ corresponding to the second equalized signal is computed by $E_{ye}(n)=E_x^T h_{yx}+E_y^T h_{yy}$, where $E_x^T$ and $E_y^T$ are vectors comprising the electric field $E_x$ and the electric field $E_y$, respectively, for a plurality of previously received samples in the optical signal, and $h_{xx}$, $h_{xy}$, $h_{yy}$, and $h_{yx}$, are vectors comprising complex tap weights corresponding to the plurality of previously received samples.

22. The computer readable storage media of claim 21, wherein the Stokes parameters comprise $S_{1e}$, $S_{2e}$, and $S_{3e}$ defined by $S_{1e}(n)=|E_{xe}(n)|^2-|E_{ye}(n)|^2$, $S_{2e}(n)=2\Re\{E_{xe}(n)E_{ye}^*(n)\}$, and $S_{3e}(n)=2\Im\{E_{xe}(n)E_{ye}^*(n)\}$, where $\Re\{A\}$ denotes the real portion of a complex number A, $\Im\{A\}$ denotes the imaginary part of the complex number A, and A* denotes the complex conjugate of the complex number A.

23. A method comprising:
   receiving an optical signal corresponding to a modulated signal comprising a plurality of modulated symbols;
   determining a first signal corresponding to a first polarization of the optical signal, wherein the first polarization comprises a linear polarization in an x-direction, and wherein the first signal corresponds to an electric field $E_x$ in the x-direction;
   determining a second signal corresponding to a second polarization of the optical signal, wherein the second polarization comprises a linear polarization in a y-direction orthogonal to the x-direction, and wherein the second signal corresponds to an electric field $E_y$ in the y-direction;
   filtering the first signal and the second signal with an adaptive filter to obtain a first equalized signal corresponding to an electric field $E_{xe}$ in the x-direction and a second equalized signal corresponding to an electric field $E_{ye}$ in the y-direction, the first equalized signal and the second equalized signal forming an equalized modulated signal comprising a plurality of equalized modulated symbols, wherein filtering the first signal and the second signal with an adaptive filter comprises filtering the first and second signal with a butterfly equalizer, the butterfly equalizer comprising a plurality of complex tap weights corresponding to a plurality of signals equalized at a previous update cycle, and wherein an $n^{th}$ equalized x-polarization signal $E_{xe}(n)$ corresponding to the first equalized signal is computed by $E_{xe}(n)=E_x^T h_{xx}+E_y^T h_{xy}$, an $n^{th}$ equalized y-polarization signal $E_{ye}(n)$ corresponding to the second equalized signal is computed by $E_{ye}(n)=E_x^T h_{yx}+E_y^T h_{yy}$, where $E_x^T$ and $E_y^T$ are vectors comprising the electric field $E_x$ and the electric field $E_y$, respectively, for a plurality of previously received samples in the optical signal, and $h_{xx}$, $h_{xy}$, $h_{yy}$, and $h_{yx}$, are vectors comprising complex tap weights corresponding to the plurality of previously received samples;

computing a set of Stokes parameters from the equalized modulation signal, wherein the Stokes parameters comprise $S_{1e}$, $S_{2e}$, and $S_{3e}$ defined by $S_{1e}(n)=|E_{xe}(n)|^2-|E_{ye}(n)|^2$, $S_{2e}(n)=2\Re\{E_{xe}(n)E_{ye}^*(n)\}$, and $S_{3e}(n)=2\Im\{E_{xe}(n)E_{ye}^*(n)\}$, where $\Re\{A\}$ denotes the real portion of a complex number A, $\Im\{A\}$ denotes the imaginary part of the complex number A, and A* denotes the complex conjugate of the complex number A; and updating the adaptive filter based on a metric derived from the set of Stokes parameters.

\* \* \* \* \*